US012230258B2

(12) United States Patent
Biadsy et al.

(10) Patent No.: US 12,230,258 B2
(45) Date of Patent: Feb. 18, 2025

(54) SUB-MODELS FOR NEURAL CONTEXTUAL BIASING

(71) Applicant: Google LLC, Mountain View, CA (US)

(72) Inventors: Fadi Biadsy, Mountain View, CA (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 325 days.

(21) Appl. No.: 17/659,836

(22) Filed: Apr. 19, 2022

(65) Prior Publication Data

US 2023/0335122 A1    Oct. 19, 2023

(51) Int. Cl.
*G10L 15/183*    (2013.01)
*G06N 3/04*    (2023.01)

(52) U.S. Cl.
CPC .............. *G10L 15/183* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 11,587,569 B2* | 2/2023 | Ye | G10L 15/063 |
| 2020/0302916 A1 | 9/2020 | Mengibar et al. | |
| 2020/0380215 A1* | 12/2020 | Kannan | G10L 15/005 |
| 2020/0402501 A1 | 12/2020 | Prabhavalkar et al. | |
| 2022/0122596 A1* | 4/2022 | Jessa | G10L 15/063 |
| 2023/0026945 A1* | 1/2023 | Friedlander | G06N 3/045 |

FOREIGN PATENT DOCUMENTS

CN    112992127 A  *  6/2021    .......... G10L 15/063

OTHER PUBLICATIONS

Katrin Tomanek, Vicky Zayats, Dirk Padfield, Kara Vaillancourt, Fadi Biadsy "Residual Adapters for Parameter-Efficient ASR Adaptation to Atypical and Accented Speech" arXiv:2109.06952v1 [cs.CL] Sep. 14, 2021 (Year: 2021).*

(Continued)

*Primary Examiner* — Richemond Dorvil
*Assistant Examiner* — Alexander G Marlow
(74) *Attorney, Agent, or Firm* — Honigman LLP; Brett A. Krueger; Grant Griffith

(57) ABSTRACT

A method for contextual biasing for speech recognition includes obtaining a base automatic speech recognition (ASR) model trained on non-biased data and a sub-model trained on biased data representative of a particular domain. The method includes receiving a speech recognition request including audio data characterizing an utterance captured in streaming audio. The method further includes determining whether the speech recognition request includes a contextual indicator indicating the particular domain. When the speech recognition request does not include the contextual indicator, the method includes generating, using the base ASR model, a first speech recognition result of the utterance by processing the audio data. When the speech recognition request includes the contextual indicator the method includes biasing, using the sub-model, the base ASR model toward the particular domain and generating, using the biased base ASR model, a second speech recognition result of the utterance by processing the audio data.

20 Claims, 11 Drawing Sheets

(56) References Cited

OTHER PUBLICATIONS

Tsendsuren Munkhdalai, Youzheng Chen, Khe Chai Sim, Fadi Biadsy, Tara Sainath, Pedro Moreno Mengibar "Hierarchical Recurrent Adapters for Efficient Multi-Task Adaptation of Large Speech Models" arXiv:2403.19709v1 [eess.AS] Mar. 25, 2024 (Year: 2024).*

Fadi Biadsy, Youzheng Chen, Xia Zhang, Oleg Rybakov, Andrew Rosenberg, Pedro J. Moreno "A Scalable Model Specialization Framework for Training and Inference using Submodels and its Application to Speech Model Personalization" arXiv:2203.12559v1 (Year: 2022).*

Neil Houlsby, Andrei Giurgiu, Stanislaw Jastrzebski, Bruna Morrone, Quentin de Laroussilhe, Andrea Gesmundo, Mona Attariyan, Sylvain Gelly "Parameter-Efficient Transfer Learning for NLP" arXiv:1902.00751v2 [cs. LG] Jun. 13, 2019 (Year: 2019).*

Asa Cooper Stickland, Iain Murray "BERT and PALs: Projected Attention Layers for Efficient Adaptation in Multi-Task Learning" arXiv:1902.02671v2 [cs.LG] May 15, 2019 (Year: 2019).*

Asa Cooper Stickland, Iain Murray. "BERT and PALs: Projected Attention Layers for Efficient Adaptation in Multi-Task Learning" arXiv:1902.02671v2 (Year: 2019).*

International Search Report and Written Opinion for the related Application No. PCT/US2023/019030, dated Jul. 13, 2023, 60 pages.

Petar Aleksic et al: "Bringing Contextual Information to Google Speech Recognition", INTERSPEECH 2015, Sep. 6, 2015 (Sep. 6, 2015), pp. 468-472, XP055345740, Retrieved from the Internet: URL:https://static.googleusercontent.com/medi a/ research.google.com/en//pubs/archive/43819. pdf [retrieved on Feb. 14, 2017], 5 pages.

Pundak Golan et al: "Deep Context: End-to-end Contextual Speech Recognition", 2018 IEEE Spoken Language Technology Workshop (SLT), IEEE, Dec. 18, 2018 (Dec. 18, 2018), pp. 418-425, XP033516980, DOI: 10.1109/SLT.2018.8639034 [retrieved on Feb. 11, 2019], 8 pages.

Moriokal Tsuyoshi et al: "Language Model Domain Adaptation Via Recurrent Neural Networks with Domain- Shared and Domain-Specific Representations", 2018 IEEE International Conference on Acoustics, Speech and Signal Processing (ICASSP), IEEE, Apr. 15, 2018 (Apr. 15, 2018}, pp. 6084-6088, XP033401895, DOI: 10.f109/ICASSP.2018.8462631 [retrieved on Sep. 10, 2018], 5 pages.

"Embedling, Beyond Just Words", Mohammed Alhamid, Jun. 4, 2021.

"Theme-weighted Ranking of Keywords from Text Documents using Phrase Embeddings", Mahata et al., 2018.

* cited by examiner

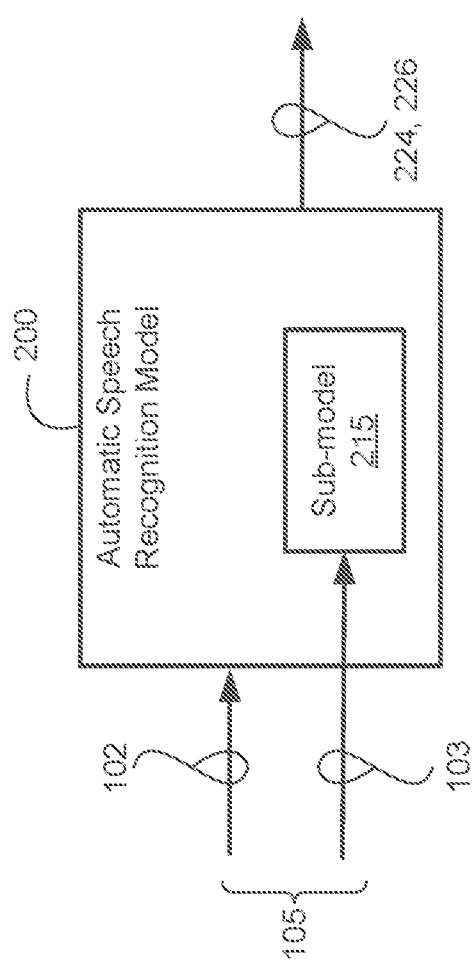

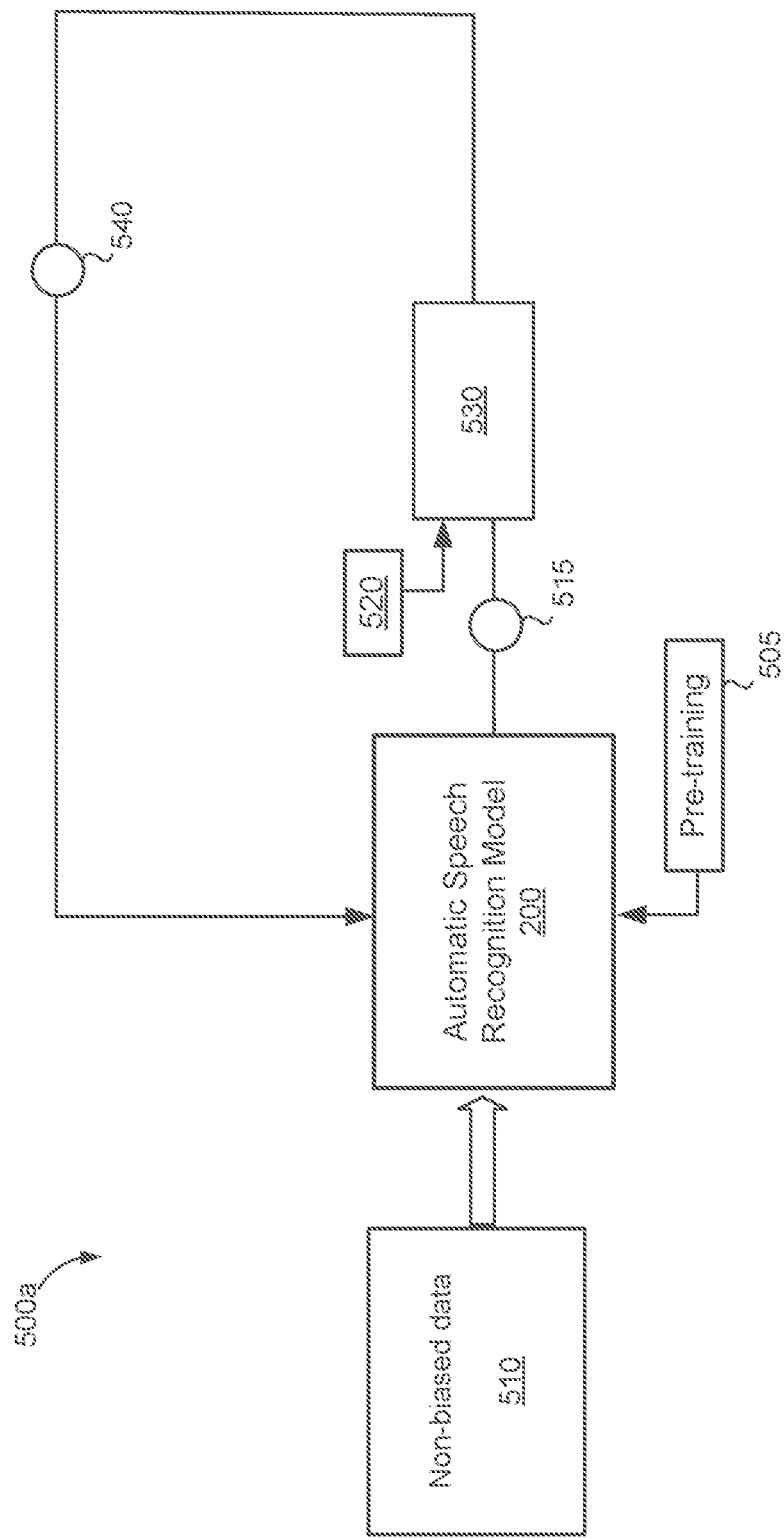

SUB-MODELS FOR NEURAL CONTEXTUAL BIASING

TECHNICAL FIELD

This disclosure relates to using sub-models for contextual biasing of results of a base machine learning model.

BACKGROUND

Automatic speech recognition (ASR) is a category of natural language processing (NLP) which involves processing audio containing human speech. An ASR model is often used to recognize and/or translate spoken language into text. One way to produce an ASR model is by using machine learning to train a model on large sets of data. Due to the amount of data that is used for training and the amount of time the training takes, ASR models are usually generalized for many domains and users, which make the models inflexible. Attempts to make ASR models more flexible, such as by using a number of smaller models, can be computationally expensive (e.g., through redundancies in training the multiple models) or provide skewed results (e.g., models with less training data will not be as robust).

SUMMARY

One aspect of the disclosure provides a computer-implemented method for biasing speech recognition results based on a context. The computer-implemented method when executed by data processing hardware causes the data processing hardware to perform operations including obtaining a base automatic speech recognition (ASR) model trained on non-biased data. The operations include obtaining a sub-model trained on biased data, the biased data representative of a particular domain. The operations further include receiving a speech recognition request including audio data characterizing an utterance captured in streaming audio. The operations include determining whether the speech recognition request includes a contextual indicator indicating the particular domain. When the speech recognition request does not include the contextual indicator, the operations include generating, using the base ASR model, a first speech recognition result of the utterance by processing the audio data. When the speech recognition request includes the contextual indicator, the operations include biasing, using the sub-model, the base ASR model toward the particular domain and generating, using the biased base ASR model, a second speech recognition result of the utterance by processing the audio data, the second speech recognition result biased toward one or more terms in the particular domain.

Implementations of the disclosure may include one or more of the following optional features. In some implementations, the contextual indicator includes a one-hot vector. In these implementations, the one-hot vector may indicate a particular sub-model from a plurality of sub-models to be activated, each sub-model of the plurality of sub-models associated with a different domain. In these implementations, the operations may further include projecting the one-hot vector into a phrase set embedding of an embedding space. These implementations may additionally include projecting the one-hot vector into the phrase set embedding causing the phrase set embedding to activate a portion of the sub-model.

In some implementations, the sub-model is disposed in a layer of the base ASR model. In these implementations, the base ASR model may include an encoder and a decoder, and the sub-model is disposed in between two layers of the encoder. Further, the one or more parameters of the base ASR may be frozen. In some implementations, the operations further include retraining the sub-model based on the speech recognition request, including the audio data and the contextual indicator, and a transcript of the audio data. In some implementations the first speech recognition result is different from the second speech recognition result.

Another aspect of the disclosure provides a system for biasing speech recognition results based on a context. The system includes data processing hardware and memory hardware in communication with the data processing hardware. The memory hardware stores instructions that when executed on the data processing hardware cause the data processing hardware to perform operations. The operations include obtaining a base automatic speech recognition (ASR) model trained on non-biased data. The operations include obtaining a sub-model trained on biased data, the biased data representative of a particular domain. The operations further include receiving a speech recognition request including audio data characterizing an utterance captured in streaming audio. The operations include determining whether the speech recognition request includes a contextual indicator indicating the particular domain. When the speech recognition request does not include the contextual indicator, the operations include generating, using the base ASR model, a first speech recognition result of the utterance by processing the audio data. When the speech recognition request includes the contextual indicator, the operations include biasing, using the sub-model, the base ASR model toward the particular domain and generating, using the biased base ASR model, a second speech recognition result of the utterance by processing the audio data, the second speech recognition result biased toward one or more terms in the particular domain.

This aspect may include one or more of the following optional features. In some implementations, the contextual indicator includes a one-hot vector. In these implementations, the one-hot vector may indicate a particular sub-model from a plurality of sub-models to be activated, each sub-model of the plurality of sub-models associated with a different domain. In these implementations, the operations may further include projecting the one-hot vector into a phrase set embedding of an embedding space. These implementations may additionally include projecting the one-hot vector into the phrase set embedding causing the phrase set embedding to activate a portion of the sub-model.

In some implementations, the sub-model is disposed in a layer of the base ASR model. In these implementations, the base ASR model may include an encoder and a decoder, and the sub-model is disposed in between two layers of the encoder. Further, the one or more parameters of the base ASR may be frozen. In some implementations, the operations further include retraining the sub-model based on the speech recognition request, including the audio data and the contextual indicator, and a transcript of the audio data. In some implementations the first speech recognition result is different from the second speech recognition result.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of an ASR model for producing biased speech recognition results using a sub-model.

FIG. 5A is a schematic view of an example training scheme for the ASR model.

Like reference symbols in the various drawings indicate like elements.

DETAILED DESCRIPTION

Figure 1:
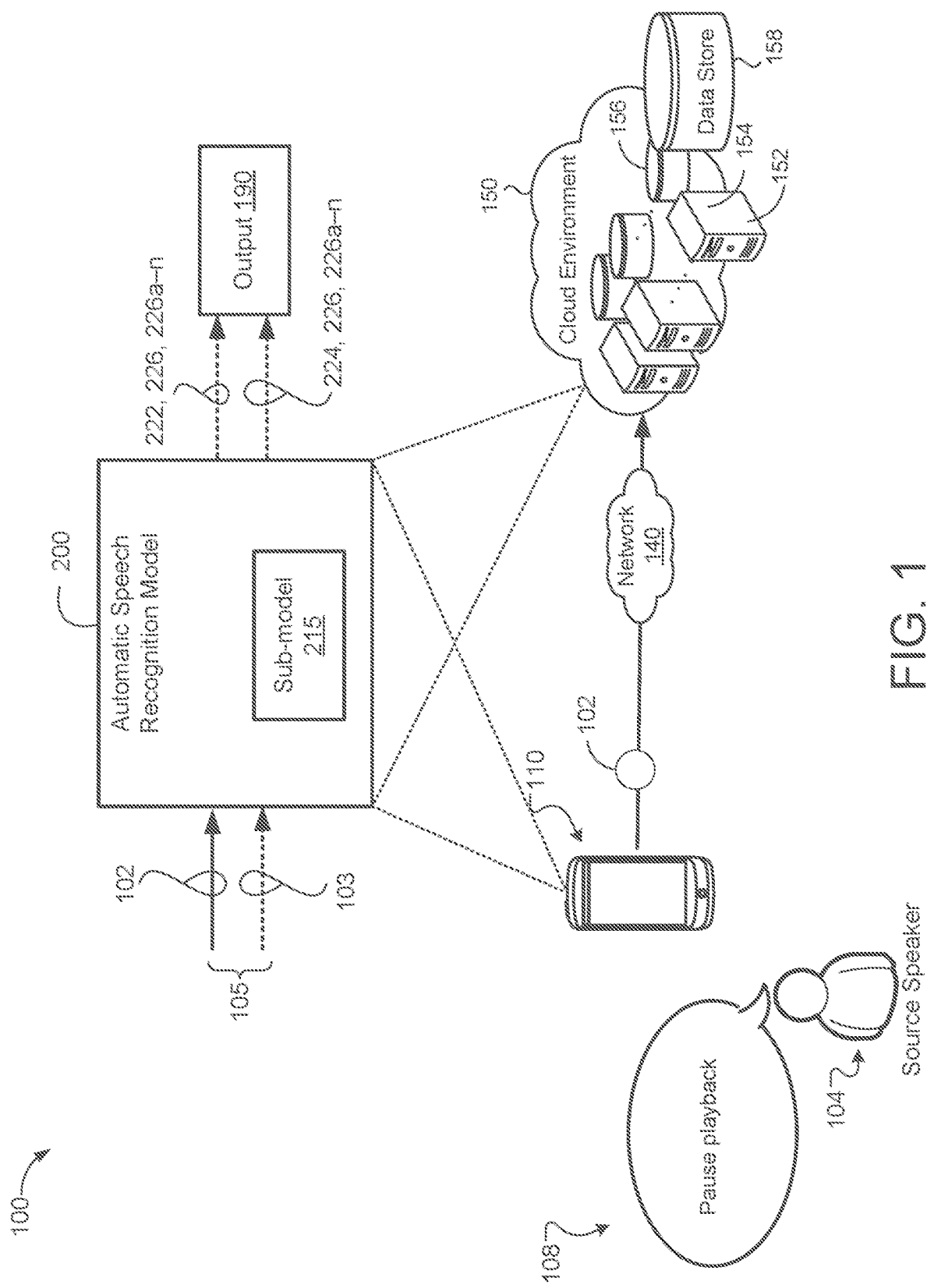
FIG. 1 is a schematic view of an example system for a contextual biasing system including an automatic speech recognition (ASR) model.

Automatic speech recognition (ASR) is a growing field of language processing which has a wide variety of uses, from automatic translation and transcription of speech to processing voice commands for computing devices. Recently, neural networks for machine learning have been found to perform well as a base for ASR systems and models. Using machine learning techniques, ASR models may be trained on large sets of training data including audio samples of speech to produce a robust model for speech recognition. Generally, these ASR models are large, as the more extensively the model is trained, the better it performs. However, there are drawbacks to using such large models such as a single model used for a wide variety of users with different characteristics. For example, a single ASR model may be built for the English language even though English speakers can have many different accents or colloquialisms based on region. In turn, the ASR model may not perform as accurately for certain groups of users. Further, it is difficult to retrain or update models due to the size because of the computational expenses. This may cause the ASR model to be out of date and not perform well for new/emerging words/phrases (e.g., slang, new TV shows).

The inflexibility of large ASR models hinders the potential viability of speech recognition as the ASR model may not perform well for portions of the user base. In particular, these large ASR models may not be able to take advantage of contextual signals that can help provide information about the speech. As described above, a location of a user may provide information about an accent or add/eliminate certain words or phrases that inform ASR model outputs. In another example, when an alarm is sounding from a smart device, there is a greater than typical likelihood that a user will speak voice commands related to the alarm (e.g., "stop alarm," "cancel," "snooze"). Current ASR models (e.g., large or general models) are not able to use that contextual information to influence the output.

Conventional attempts to "personalize" ASR models based on context are difficult and can cause problems during implementation. One technique for incorporating context information with an ASR model is by using a number of smaller ASR models, each relating to a particular context or domain. However, training a number of smaller ASR models would be computationally expensive, especially as a lot of the training would be redundant between models. Additionally, it would be time consuming to train a number of models, as the process can take weeks to train each model from scratch. Even if all of the ASR models were built and trained, some ASR models would perform poorly due to a lack of available training data and managing the models can be cumbersome. Another way to consider context information is to modify the ASR model to receive biasing terms to influence results. However, this typically involves significant manual intervention (e.g., in building user domain-specific models) and may cause catastrophic forgetting, where the general traffic of the ASR model may over trigger towards the biasing terms when they were not spoken or not trigger at all even when the biasing term is present.

Implementations herein are directed toward a base ASR model that includes one or more sub-models to bias the base ASR model based on context such that results or outputs of the model are directed to the particular context or domain. A sub-model is a set of parameters that can be added to or replaced from the general base ASR model. The sub-model can be loaded/enabled/disabled when necessary, allowing use of the base ASR model without biasing, thereby nullifying catastrophic forgetting concerns. In some examples, the base ASR model is trained and then the parameters of the base ASR model are frozen during operation (i.e., inference). In this manner, the base ASR model remains stable and can continue to work for general traffic or multiple domains. However, when contextual information is available, the base ASR model may activate an appropriate sub-model for the contextual information in order to bias speech recognition results toward terms relevant to the contextual information. One advantage of these implementations includes that the sub-models can be trained individually without having to train or retrain the large base ASR model. Further, one or more sub-models can be loaded and replaced dynamically and in real time per request (e.g., using a memory cache) The base ASR model remains unchanged with or without the use of sub-models, which eliminates concerns that the model will be compromised through use and/or updates.

As used herein, and unless specified otherwise, the terms "speech recognition system" and "speech recognition model" can refer to any combination of an ASR system/model, in which speech is recognized and processed by a computing device. As will become apparent, the ASR models of the current disclosure, as well as techniques for training ASR and sub-models, will enable biasing speech recognition based on contextual information.

FIG. 1 illustrates a contextual biasing system 100 including an automatic speech recognition (ASR) model 200 and a sub-model 215. The ASR model 200, using the sub-model 215, is configured to process a speech recognition request 105. The speech recognition request 105 includes input audio data 102 corresponding to an utterance 108 spoken by a source speaker 104 and captured by a user device 110. The speech recognition request 105 may also include a contextual indicator 103. Using the audio data 102 and the contextual indicator 103, the ASR model 200 and the sub-model 215 generate or predict an unbiased speech recognition result 222 or a biased speech recognition result 224. The biased speech recognition result 224 is more likely to include words or phrases associated with a domain the ASR model 200 is biased toward using sub-model 215 (e.g., based on the contextual indicator 103). In some examples, the input audio data 102 includes input spectrograms corresponding to the utterance 108. The contextual indicator 103 may provide an indication of a particular domain among a plurality of different domains each signifying or representing a respective context of the utterance 108. In some implementations, the speech recognition results 222, 224 include a probability density function 226, 226A-B representing the density of the probabilities of the textual translation of the utterance 108.

While not shown, an acoustic front-end residing on the user device 110 may convert a time-domain audio waveform of the utterance 108 captured via a microphone of the user device 110 into the input spectrograms 102 or other type or form of audio data 102. Further, the front-end device may be configured to determine or obtain data representing a contextual indicator 103 affecting the utterance 108 and or other pertinent information corresponding to the source speaker 104 and/or client device 110.

The user device 110 associated with the source speaker 104 may capture the utterance 108 spoken by the source speaker 104 and provide the corresponding input audio data 102 as part of a speech recognition request 105 to the contextual biasing system 100. Additionally, the user device 110 may determine a contextual indicator 103 to include with the speech recognition request 105. The user device 110 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system. Alternatively, a remote server 112 may process the audio data 102 and any other additional data or metadata from the user device 110 to determine the contextual indicator 103.

The contextual biasing system 100 may be distributed across multiple devices such that the ASR model 200 resides on one of the user device 110 or a remote system 150 (also referred to herein as a cloud computing environment) in communication with the user device 110 via a network 140. The remote system 150 may be a single computer, multiple computers, or a distributed system (e.g., a cloud environment) having scalable/elastic resources 152 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user device 110 or the computing resources 154. The ASR model 200 and the sub-model 215 may execute on the remote system 150 or the user device 110. The sub-model 215 may stored locally at the user device 110 or stored on the remote system (e.g., at the data store 158), or some combination there between.

The contextual biasing system 100 implements a dynamic model including two or more component parts or models including a general base model (e.g., the ASR model 200) and a "swappable" sub-model 215 to generate biased speech recognition results 224 based on a received speech recognition request 105. The ASR model 200 may be trained on a large set of speech data. Once trained, the ASR model 200 may be frozen, such that the parameters of the ASR model 200 remain constant during operation. The ASR model 200 may be updated, retrained, or replaced as necessary or when additional training data becomes available. In some implementations, a single sub-model 215 is used for biasing the ASR model 200 by activating certain parameters based on the contextual indicator 103 of the speech recognition request 105. In other implementations, the system 100 includes a plurality of sub-models 215, with each sub-model 215 corresponding to a particular domain. In these implementations, a particular sub-model 215 is selected/activated based on the contextual indicator 103. For example, when a contextual indicator 103 indicates that a domain including a user's alarm is applicable, a respective sub-model 215 that biases toward particular terms (e.g., snooze, stop, etc.) relevant to the indicated domain (i.e., the user's alarm) is selected. When the speech recognition request 105 does not have a contextual indicator 103 or when a sub-model 215 corresponding to the contextual indicator does not exist or is under-developed, the ASR model 200, in some examples, generates an unbiased speech recognition result 222. That is, the unbiased speech recognition result 222 is generated solely by the ASR model 200 and is not affected or influenced by any sub-model 215.

The contextual indicator 103 may be based on any signal or data that can be used to improve accuracy of the biased speech recognition result 224. The contextual indicator 103 may be based on information related to the source speaker 104. For example, the source speaker 104 has a specific dialect, native language, mannerisms, pattern of speech, speech disfluencies, etc. Accordingly, the system 100 may generate and train a sub-model 215 corresponding to the source speaker 104, where the sub-model 215 biases/personalizes the ASR model 200 to make predictions that suit the source speaker 104 specifically. In some implementations, the contextual indicator 103 includes a one-hot vector and the system uses the contextual indicator 103 to select an appropriate sub-model 215 (i.e., the sub-model 215 corresponding to the source speaker 104) from a plurality of different sub-models 215.

In some implementations, the contextual indicator 103 is based on information related to the user device 110. For example, the user device 110 may include a smart device equipped with sensors such as GPS, an accelerometer, a gyroscope, a microphone, a proximity sensor, a camera, etc. The contextual indicator 103 may indicate a domain related to the user device 110, as inferred from one of the sensors. For example, the contextual indicator 103 may indicate a geographical location of the user device 110, as inferred from GPS data (with the explicit consent by the user 104 to share his/her geographical location which may be revoked at any time) Here, the contextual indicator 103 may correspond to a more geographical location (e.g., a city such as Chicago) or to a more particular location (e.g., a gym). In either instance, the sub-model 215 may bias the biased speech recognition result 224 toward a particular domain based on the location. In particular, a contextual indicator 103 identifying the location Chicago may activate a sub-model 215 trained on data from users from that city, state, and/or region, which may be biased based on accents or other features of speech of users from that area as well as named entities (e.g., restaurants, sports teams, street names, etc.) unique to that region. As a result, the sub-model 215 may bias the ASR model 200 to generate a biased speech recognition result 224 biased toward predictions that fit that domain. For example, the biased speech recognition result 224 may increase a likelihood of the ASR model 200 predicting that the utterance 108 includes a reference to a restaurant or street in Chicago. Similarly, a contextual indicator 103 indicating the source speaker 104 is at a gym may activate a sub-model 215 trained based on speech from users that are exercising or are in similar locations. Here, the speech may be influenced by labored breathing or directed to particular words or phrases (e.g., voice instructions for operating a music player on a smart device). Accordingly, the sub-model 215 can factor in these contextual elements when processing the audio data 102 to produce the biased speech recognition results 224. In another example, the contextual indicator 103 may indicate a software application currently executing on the user device 110, such as a music player application. In this example, the contextual indicator 103 identifies a sub-model 215 corresponding to the software application (e.g., the music player) indicated by the contextual indicator 103 in order to bias the ASR model 200 to recognize terms/phrases such as "next song" or "pause." In other examples, the sub-model 215 is trained for that type of application or domain generally. Thus, when the source speaker 104 speaks the utterance 108 "pause playback," the ASR model 200 biased by the sub-model 215 will generate biased speech recognition result 224 that are skewed or biased toward results directed to a music player relative to an unbiased speech recognition result 222 determined without activating the sub-model 215.

In some implementations, the contextual indicator 103 indicates that multiple domains are applicable to the utterance 108. In this scenario, a single sub-model 215 may bias the ASR model 200 to generate biased speech recognition results 224 toward each of the multiple domains. Alternatively, multiple sub-models 215 (each trained for one or more of the multiple domains) may bias the ASR model 200 to generate biased speech recognition results 224 toward each of the multiple domains. For example, when the source speaker 104 is located in a gym and a music player is executing the user device, one or more sub-models 215 may bias the output of the ASR model 200 toward each of these domains.

An output 190 may receive the un-biased and biased speech recognition results 222, 224 generated by the ASR model 200. In some examples, the output 190 includes a natural language understanding (NLU) that performs query interpretation on the speech recognition results. The NLU may further instruct a downstream application/service to perform an action based on the results. The output 190 may also include a user interface generator configured to display the speech recognition results as a transcription on a screen of the user device 110 and/or another device.

The system of FIG. 1 is presented for illustrative purposes only and is not intended to be limiting. For example, although only a single example of each component is illustrated, the system 100 may include any number of components 110, 112, 140, 150, 200, and 215. Further, although some components are described as being located in a cloud computing environment 150, in some implementations those components may be hosted locally on the user device 110. Further, in various implementations, some or all of the components 112, 200, and 215, are hosted locally on user device 110, remotely (such as in cloud computing environment 150), or some combination thereof.

Referring now to FIG. 2A, an exemplary ASR model 200 implements a sub-model 215 to produce the biased speech recognition results 224 (e.g., a probability density function 226). Here, the ASR model 200 receives a speech recognition request 105 including the audio data 102 and the contextual indicator 103. In this instance, the sub-model 215 includes a single model trained on various inputs and contexts corresponding to a variety of domains. The contextual indicator 103 may be a one-hot vector indicating one or more particular domains corresponding to the context of the audio data 102. The one-hot vector may be concatenated and projected into a phrase set embedding prior to being transmitted to the sub-model 215. In some implementations, the one-hot vector is looked up in an embedding matrix before being projected into a phrase set embedding. Alternatively, the sub-model 215 may project the one-hot vector into a phrase set embedding. The sub-model may then activate one or more parameters corresponding to one or more particular domains indicated by the contextual indicator 103 based on the phrase set embedding to process the audio data 102.

Figure 2B:
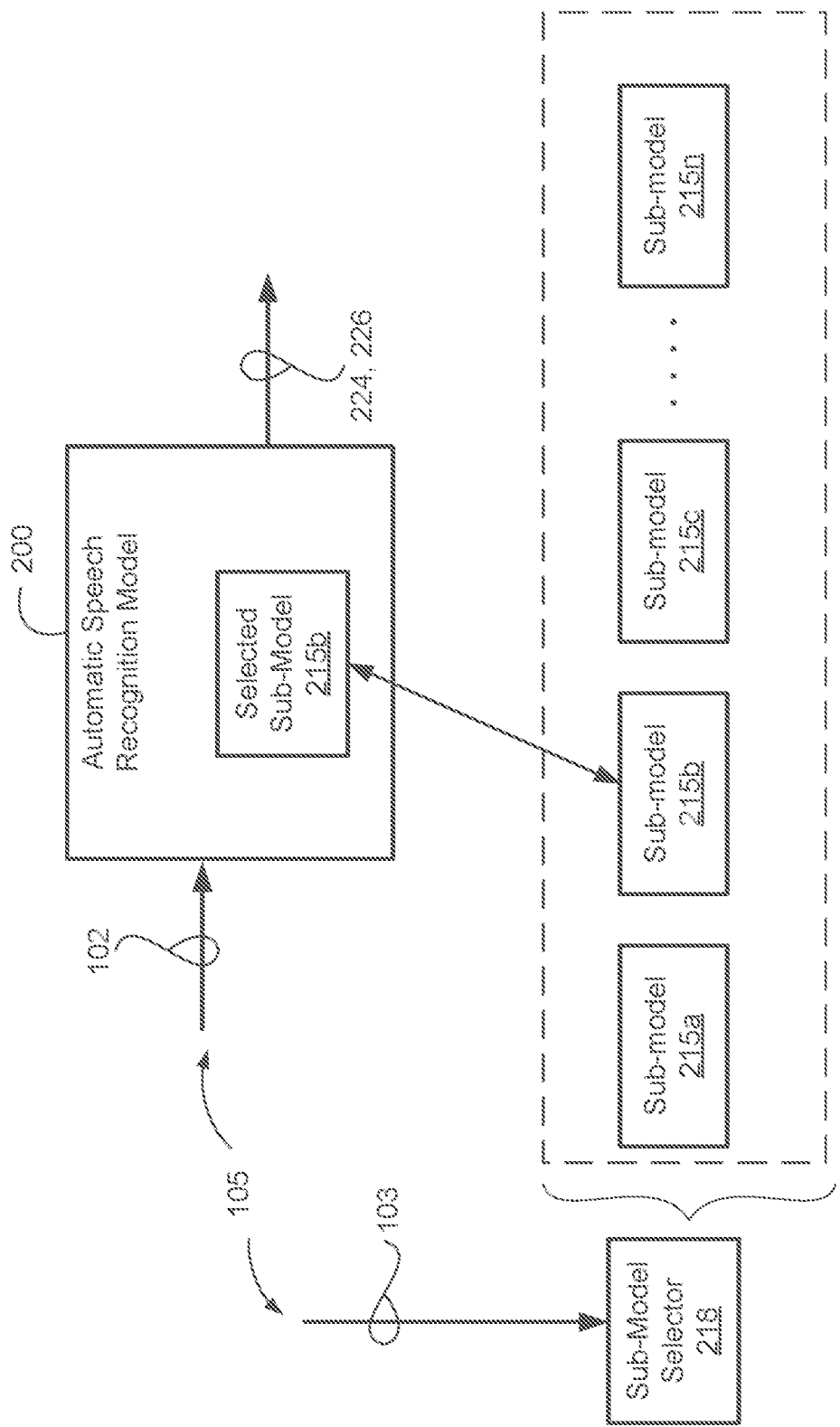
FIG. 2B is a schematic view of an ASR model for producing biased speech recognition results using a selected sub-model.

Referring now to FIG. 2B, another exemplary ASR model 200 implements a selected sub-model 215, 215b to produce the biased speech recognition results 224 (e.g., a probability density function 226). Here, the ASR model 200 receives a speech recognition request 105 including the audio data 102 and the contextual indicator 103. In this instance, the contextual indicator 103 is received by a sub-model selector 218. The sub-model selector 218 selects a particular sub-model 215 from a plurality of sub-models 215, 215a-n, where each sub-model 215 corresponds to one or more different domains. The sub-models 215a-n may be trained on data reflecting any domain that provides context for processing the audio input 102. For example, the selected sub-model 215b is based on a domain such as a location, an activity, a user profile, a software application, or any other domain that can influence the audio data 102. The contextual indicator 103 may be a one-hot vector indicating a particular domain corresponding to the context of the speech recognition request 105. Upon receiving the contextual indicator 103, the sub-model selector 218 may perform a look-up to determine the appropriate sub-model(s) 215 to use in processing the speech recognition request 105. The various sub-models 215a-n are easily swappable such that in processing a streaming audio input 102 from the user device 110, the ASR model 200 may swap in and out various sub-models 215 from the plurality of sub-models 215a-n (i.e., disable or enable the biasing provided by the sub-models 215) while processing the streaming input when new contextual indicators 103 are received. When the speech recognition request 105 does not include a contextual indicator 103 or when the contextual indicator 103 is not applicable to any available sub-model 215, then the ASR model 200 processes the audio input 102 without activating or enabling any sub-model 215 to produce the unbiased speech recognition result 222 (FIG. 1).

Figure 3A:
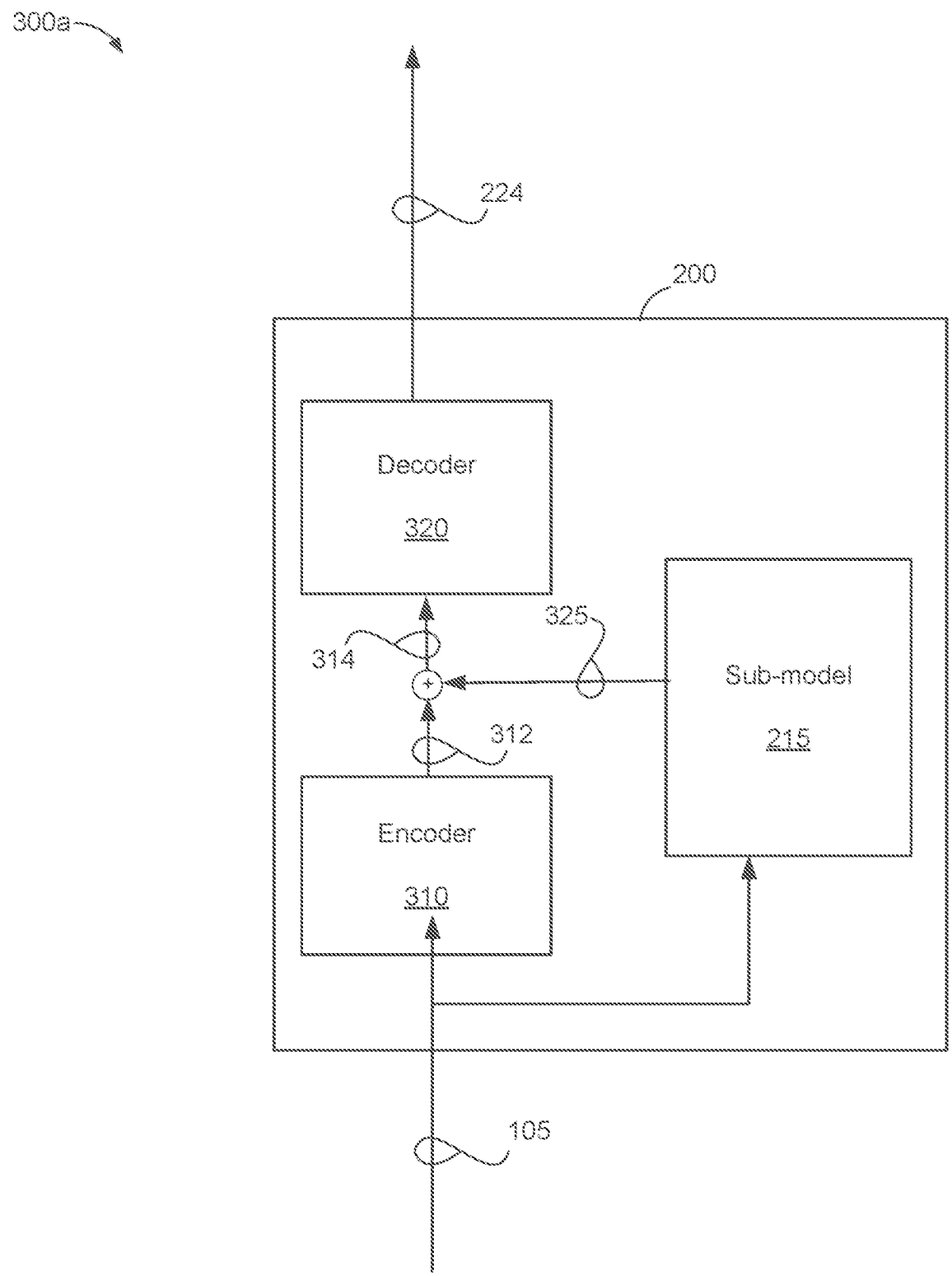
FIG. 3A is a schematic view of an ASR model for producing biased speech recognition results using a sub-model as a residual adapter layer.

The sub-model 215 may be implemented to bias the output of the ASR model 200 in any number of ways. FIG. 3A illustrates a schematic view 300a of an ASR model 200 for producing biased speech recognition results 224 using a sub-model 215 implemented as a residual adapter layer. The ASR model 200 may be a recurrent neural network (RNN) including an encoder 310 configured to encode the input audio data 102 into an encoded output 312 (e.g., a hidden feature representation including series of vectors) and a decoder 320 configured to decode the encoded output 312 into the biased speech recognition results 224. Typically, the encoded output 312 is sent straight to the decoder 320 to generate the biased speech recognition results 224. However, in this example, the sub-model 215 operates in parallel to process the speech recognition request 105. In turn, the sub-model 215 may generate a sub-model output 325 based on the received audio input 102 of the speech recognition request 105. The ASR model 200 may merge the sub-model output 325 and the encoded output 312 to produce a biased encoded output 314 to send to the decoder 320.

Figure 3B:
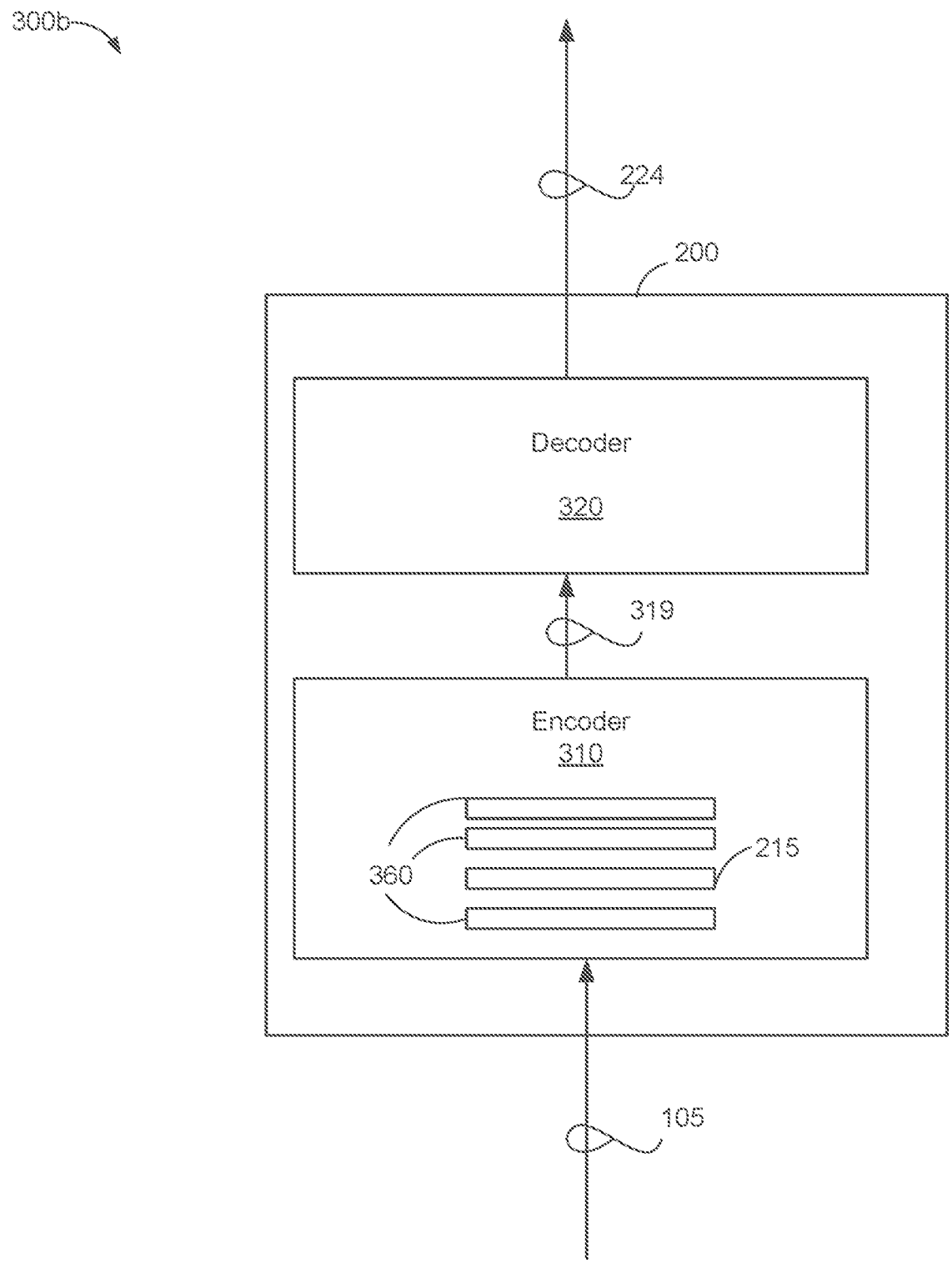
FIG. 3B is a schematic view of an ASR model for producing biased speech recognition results using a sub-model in a layer of an encoder.

In another example, the sub-model 215 is implemented between layers of the encoder 310. FIG. 3B illustrates an example schematic view 300b of such an implementation. The encoder 310 may include a number of components 360, and the sub-model 215 may be disposed in between layers of the components 360 such that the encoder 310 produces a biased encoded output 319. The components 360 of the encoder may include a stack of multi-head attention blocks (i.e., conformer blocks) which may include conformers or transformers. In some implementations, each multi-head attention block includes a multi-head attention mechanism. The encoder 310 may include a stack of long short-term memory (LSTM) in lieu of multi-head attention blocks. The decoder 320 may receive the biased encoded output 319 and generate the biased speech recognition result 224.

The above examples of FIGS. 3A and 3B are for illustrative purposes only and are not intended to be limiting. The ASR model 200 and the sub-model 215 may include any suitable structure/architecture for performing speech recognition and generating biased speech recognition results in response to a contextual indicator 103. Further, the sub-model 215 and ASR model 200 may work in any suitable combination to produce biased speech recognition results 224. For example, the sub-model 215 is disposed within the ASR model 200 at any suitable place in the architecture of the ASR model 200. For example, a sub-model 215 is deployed within a layer of the ASR model 200, as a residual adapter layer, as a tensor, as encoder/decoder layers, as a prediction network, as a joint network, etc. Alternatively, the sub-model 215 and ASR model 200 may generate outputs independently of one another, and the results may be combined by the ASR model 200, or another suitable component of the system, to determine biased speech recognition results 224. Notably, the ASR model 200 remains unchanged when the sub-model 215 is disabled from the original frozen state of the ASR model 200. That is, when the sub-model 215 is disabled (e.g., because there is no contextual indicator 103), the ASR model 200 produces the unbiased speech recognition result 222 that is not affected by the sub-model 215.

Figure 4A:
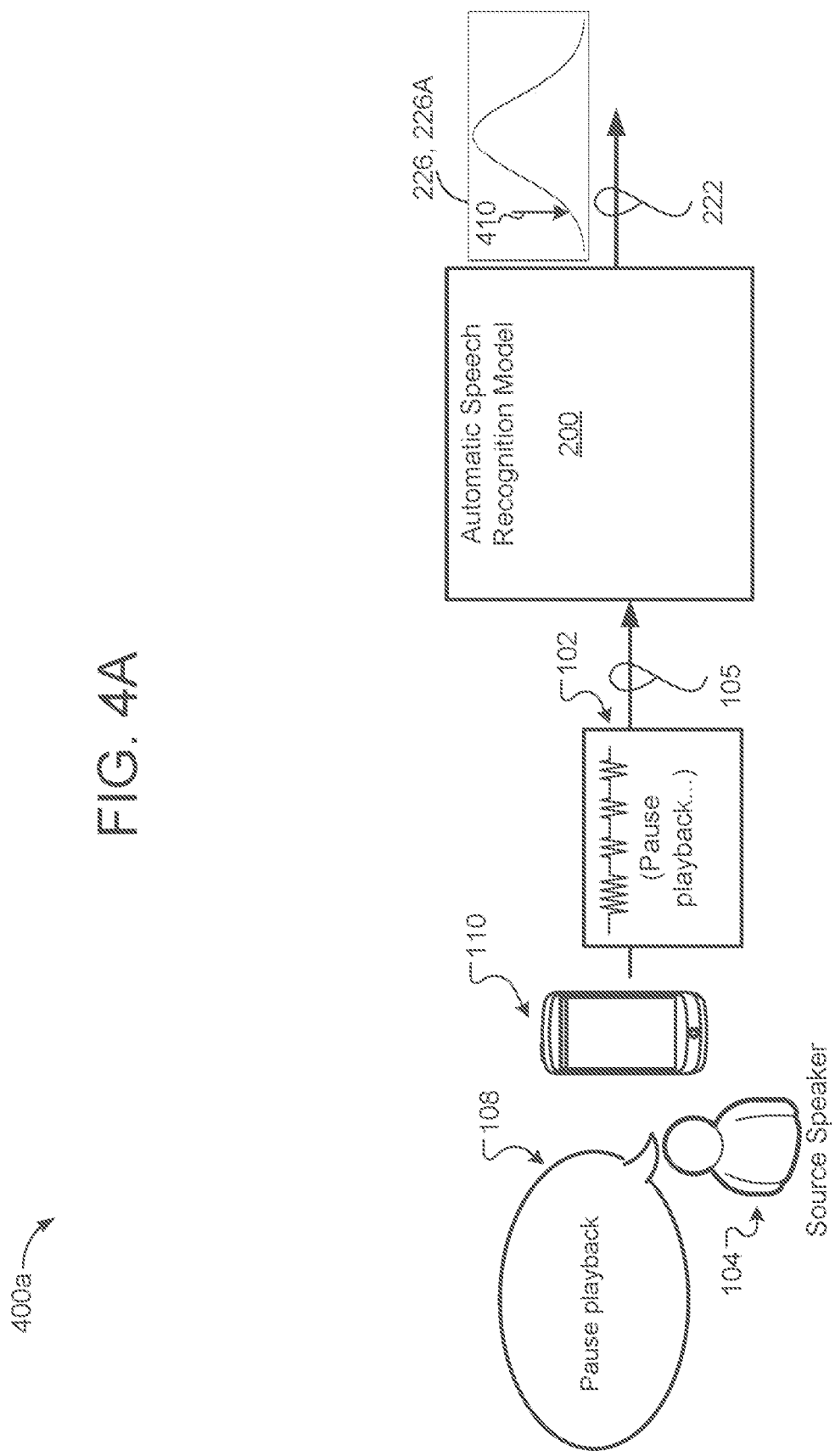
FIG. 4A is a schematic view of an ASR model generating an unbiased speech recognition result.

FIG. 4A illustrates a schematic view 400a of an ASR model 200 generating a first probability density function 226, 226A corresponding to unbiased speech recognition results 222. Here, a source speaker 104 speaks an utterance 108 ("Pause playback") that is captured by the user device 110. The user device 110 transmits the speech recognition request 105 (including the audio input 102 characterizing the utterance 108) to the ASR model 200. The ASR model 200 processes the audio input 102 to generate the unbiased speech recognition result 222. In some implementations, the ASR model 200 determines whether the speech recognition request 105 includes a contextual indicator 103 before proceeding to generate the unbiased speech recognition result 222 (e.g., the first probability density function 226A). In this example, the ASR model 200 predicts that the audio input 102 includes the phrase "pause playback" with a relatively low probability 410, making it unlikely that the utterance 108 is accurately transcribed.

Figure 4B:
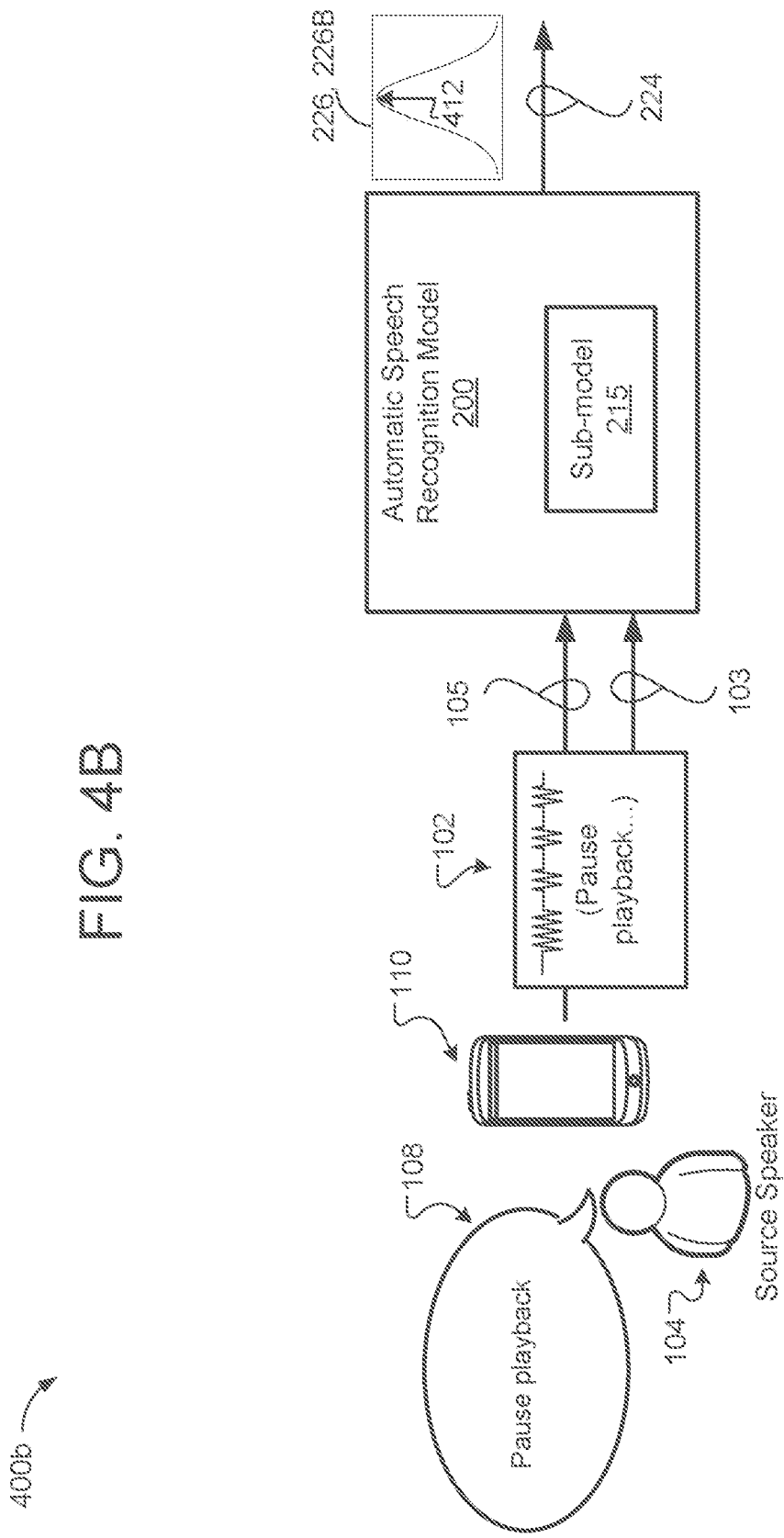
FIG. 4B is a schematic view of an ASR model using a sub-model to generate biased speech recognition results.

FIG. 4B illustrates a schematic view 400b of another exemplary ASR model 200 using a sub-model 215 to generate a second probability density function 226, 226B corresponding to a biased speech recognition results 224. Like FIG. 4A, the source speaker 104 speaks an utterance 108 ("Pause playback") that is captured by the user device 110 which is then included within the speech recognition request 105 as the audio input 102 characterizing the utterance 108 to the ASR model 200. Here, the speech recognition request 105 includes a contextual indicator 103. In this example, the contextual indicator 103 corresponds to a music player application executing on the user device 110. The ASR model 200 activates the sub-model 215 that corresponds to the domain of the music player such that the output of the ASR model 200 is biased toward that domain. For example, the sub-model 215, and subsequently the ASR model 200, is biased towards words or phrases that relate to a music player, such as "stop," "play," "pause," names of artists, names of songs, etc. The ASR model 200 generates the biased speech recognition result 224, as illustrated by probability density function 226B. As shown, the ASR model 200 predicts that the audio input 102 includes the phrase "pause playback" with a high probability 412, as the biasing provided by the sub-model 215 has "shifted" the probability density function 226B toward terms defined by the domain of the sub-model 215 relative to the probability density function 226A (FIG. 4A).

That is, the biased speech recognition result 224 is different than the unbiased speech recognition result 222. For example, even in the case of an audio input 102 where the probability density function 226A has a high confidence around a single word or term, the probability density function 226B may have an even higher confidence around the single word or term if the word or term is within the particular domain associated with the sub-model 215. In some examples, the biasing changes the probability density of the biased speech recognition result. Here, the probability density function 226B has a steeper gradient relative to the probability density function 226A, indicating that, in this example, a distribution is concentrated around a smaller number of possibilities.

The above examples of FIGS. 4A and 4B are for illustrative purposes and are not intended to be limiting. For example, the speech recognition results 222, 224 can be in any suitable format, such as a transcript, a spectrogram, etc. In some implementations, the speech recognition results 222, 224 are generated as instructions for a computing device to perform an action (e.g., instructions to pause a music application executing on the user device 110).

FIG. 5A illustrates a training process 500 for an ASR model 200. In some implementations, the process 500a employs a two-step training technique including pre-training and training. Pre-training a model is a technique used for initializing a model which can then be further fine-tuned based on additional training data 510. For the ASR model 200, pre-training may include initiating the ASR model 200 with pre-training data 505 including a plurality of spoken utterances by one or more speakers. The pre-training data 505 may further include the spoken utterances paired with corresponding ground-truth synthesized speech representations of the spoken utterances. The speech samples used for pre-training may be speech synthesized from reference transcripts in a predetermined voice and/or non-synthetic speech samples spoken by real humans.

The process 500a, after pre-training is complete, may fine-tune parameters of the pre-trained ASR model 200. The training process 500a includes training, for example, an encoder 310 and/or decoder 320 (FIG. 3A) separately or jointly in any suitable combination. The process 500 includes feeding a training input 510 to the ASR model 200. In some implementations, the training input 510 includes a plurality of speech samples spoken by a variety of different speakers. Further, the training input 510 may be labeled using label 520 indicating a target output associated with the training input 510. Upon receiving the training input 510, the ASR model 200 may generate an output 515 (e.g., an unbiased speech recognition result 222). The ASR model 200 may process the training input 510 in the manner described with respect to any of FIGS. 2-4 or any other suitable manner for speech recognition.

In some implementations, the output 515 is used by a loss function 530 to generate a loss 540. That is, the loss function 530 compares the output 515 and the label 520 to generate the loss 540, where the loss 540 indicates a discrepancy between the label 520 (i.e., the target output) and the output 515. The loss functions 530 may implement any suitable technique to determine a loss such as regression loss, mean squared error, mean squared logarithmic error, mean absolute error, binary classification, binary cross entropy, hinge loss, multi-class loss, etc. The loss 540 may then be fed directly to the ASR model 200. Here, the ASR model 200 processes the loss 540 and adjusts one or more parameters of the ASR model 200 to account for the loss 540. In some implementations, when the ASR model 200 is suitably trained, the model is frozen. In other words, the parameters remain unchanged for a period of time until it is deemed that the ASR model 200 needs to be retrained (e.g., when sufficient new training data 510 is obtained) or replaced.

Figure 5B:
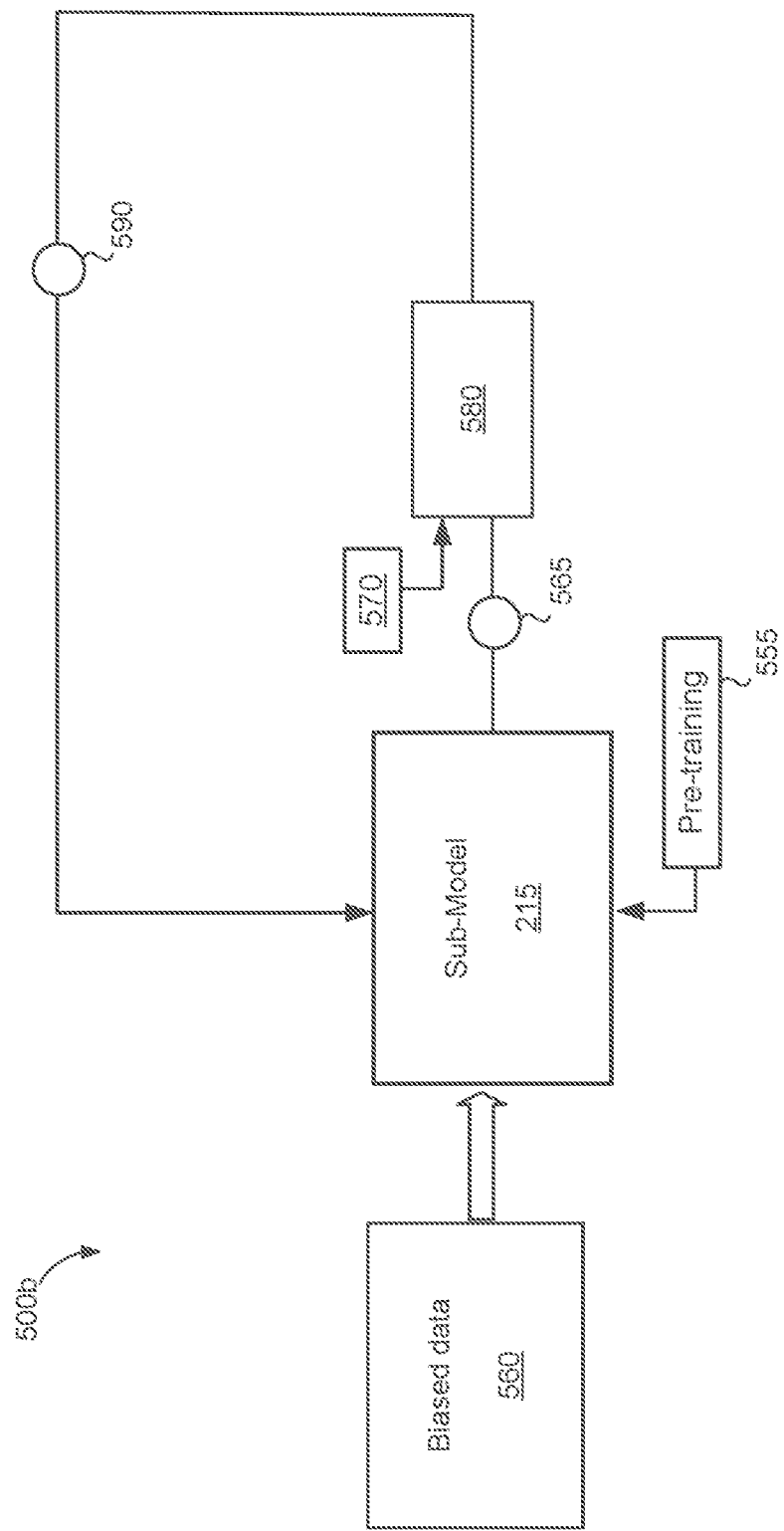
FIG. 5B is a schematic view of an example training scheme for a sub-model for biasing speech recognition results based on a context.

FIG. 5B illustrates a training process 500b for a sub-model 215. In some implementations, the process 500b employs a two-step training technique including pre-training and training. Pre-training is a technique used for initializing a model which can then be further fine-tuned based on additional training data 560. For the sub-model 215, pre-training may include initiating the sub-model 215 with pre-training data 555 including a plurality of spoken utterances by speakers. The pre-training data 555 may further include the spoken utterances paired with corresponding ground-truth synthesized speech representations of the spoken utterances. The speech samples used for pre-training may be speech synthesized from reference transcripts in a predetermined voice. For the sub-model 215, pre-training may further include adjusting one or more parameters of the sub-model 215 such that the sub-model 215 is biased to words and/or phrases of corresponding to a particular domain associated with sub-model 215.

The process 500b, in some examples, includes fine-tuning parameters of the pre-trained sub-model 215. In these examples, the process 500b includes feeding a training input 560 to the sub-model 215. In some implementations, the training input 560 includes a plurality of speech samples spoken by a variety of speakers. The training input 560 may also include a contextual indicator 103 and transcript with each speech sample. The transcript may be a manually generated text representative of the corresponding speech sample. In some implementations, the transcript is machine generated. The transcript should accurately reflect the corresponding speech sample such that the transcript is a target output of the sub-model. In some implementations, the contextual indicator 103 of the training input 560 may include a domain and/or term. In other implementations, the contextual indicator 103 of the training input 560 may include a one-hot vector. The sub-model 215 corresponding to the contextual indicator 103 may be trained on the speech sample and transcript such that the sub-model 215 is biased towards terms or phrases corresponding to the domain associated with the contextual indicator 103. In the example of a single sub-model 215 adapted to bias multiple domains, the one-hot vector of the contextual indicator 103 may be concatenated and projected into a phrase set embedding which can then be used to train the sub-model 215. Further, the training input 560 may be labeled using label 570 indicating a target output associated with the training input 560. Upon receiving the training input 560, the sub-model 215 may generate an output 565 (e.g., a biased speech recognition result). The sub-model 215 may process the training input 560 in the manner described with respect to any of FIGS. 2-4 or any other suitable manner for speech recognition.

In some implementations, the output 565 is used by a loss function 580 to generate a loss 590. That is, the loss function 580 compares the output 565 and the label 570 to generate the loss 590, where the loss 590 indicates a discrepancy between the label 570 (i.e., the target output) and the output 565. The loss functions 580 may implement any suitable technique to determine a loss such as regression loss, mean squared error, mean squared logarithmic error, mean absolute error, binary classification, binary cross entropy, hinge loss, multi-class loss, etc. The loss 590 may then be fed directly to the sub-model 215. Here, the sub-model 215 processes the loss 590 and adjusts one or more parameters of the sub-model 215 to account for the loss 590. In some implementations, the sub-model 215 is continually trained (or retrained) as additional speech recognition request are received. For example, while the ASR model 200 is frozen, the sub-model 215 can continue to adjust parameters based on received speech recognition request 105 including audio data 102, contextual indicators 103, as well as the biased speech recognition results 224. Here, in the case of a plurality of sub-models 215, each sub-model 215 can be trained upon use by the ASR model 200 for biasing to an associated domain.

While examples herein are directed toward a sub-model 215 that biases an ASR model 200 for speech detection, it is understood that the sub-model 215 and contextual indicators 103 can be used to bias any sort of model used for any purpose. For example, sub-models 215 can bias an image recognition model, recommendation models, filtering (e.g., email) models, medical diagnoses models, or any other model where contextual information can be used to bias the results to increase accuracy. As described above, the sub-models 215 may be trained on appropriate contextual indicators 103 to properly bias the underlying base model.

Figure 6:
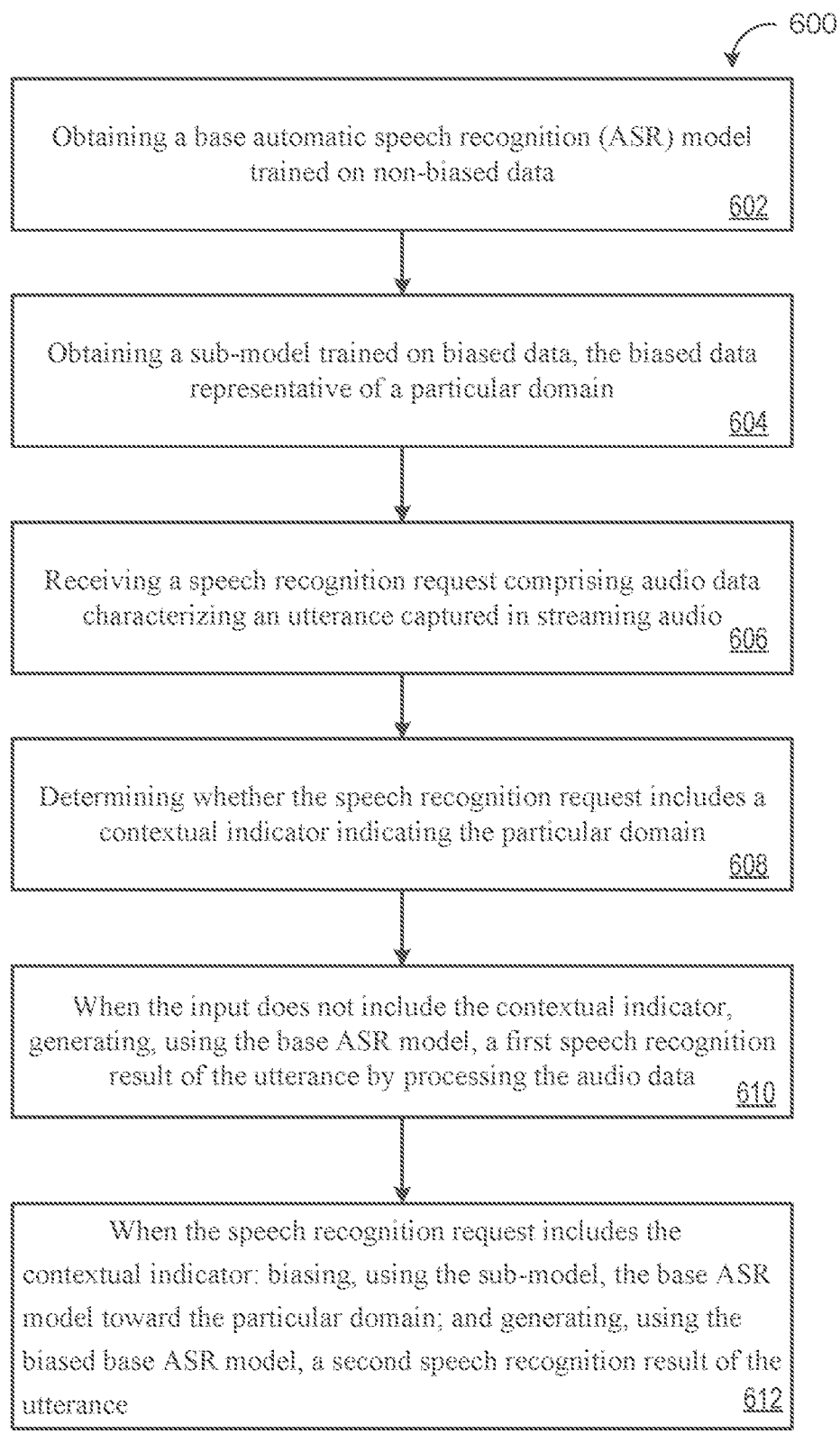
FIG. 6 is a flowchart of an example arrangement of operations for a method of contextual biasing using a sub-model.

FIG. 6 is a flow chart of an exemplary arrangement of operations for contextual biasing of results of an ASR model 200 using a sub-model 215. The method 600 may be performed, for example, by various elements of the contextual biasing system 100 of FIG. 1. At operation 602, the method 600 includes obtaining a base automatic speech recognition (ASR) model 200 trained on non-biased data 510. At operation 604, the method 600 includes obtaining a sub-model 215 trained on biased data 560, the biased data 560 representative of a particular domain. At operation 606, the method 600 includes receiving a speech recognition request 105 including audio data 102 characterizing an utterance 108 captured in streaming audio. At operation 608, the method 600 includes determining whether the speech recognition request 105 includes a contextual indicator 103 indicating the particular domain. At operation 610, when the speech recognition request 105 does not include the contextual indicator 103, the method 600 includes generating, using the base ASR model 200, a first speech recognition result 222 (i.e., an unbiased speech recognition result 222) of the utterance 108 by processing the audio data 102. At operation 612, when the speech recognition request 105 includes the contextual indicator 103, the method 600 includes biasing, using the sub-model 215, the base ASR model 200 toward the particular domain and generating, using the biased base ASR model 200, a second speech recognition result 224 (i.e., a biased speech recognition result 224) of the utterance 108 by processing the audio data 102, the second speech recognition result 224 biased toward one or more terms in the particular domain.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non volatile memory include, but are not limited to, flash memory and read-only memory (ROM)/programmable read-only memory (PROM)/erasable programmable read-only memory (EPROM)/electronically erasable programmable read-only memory (EPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
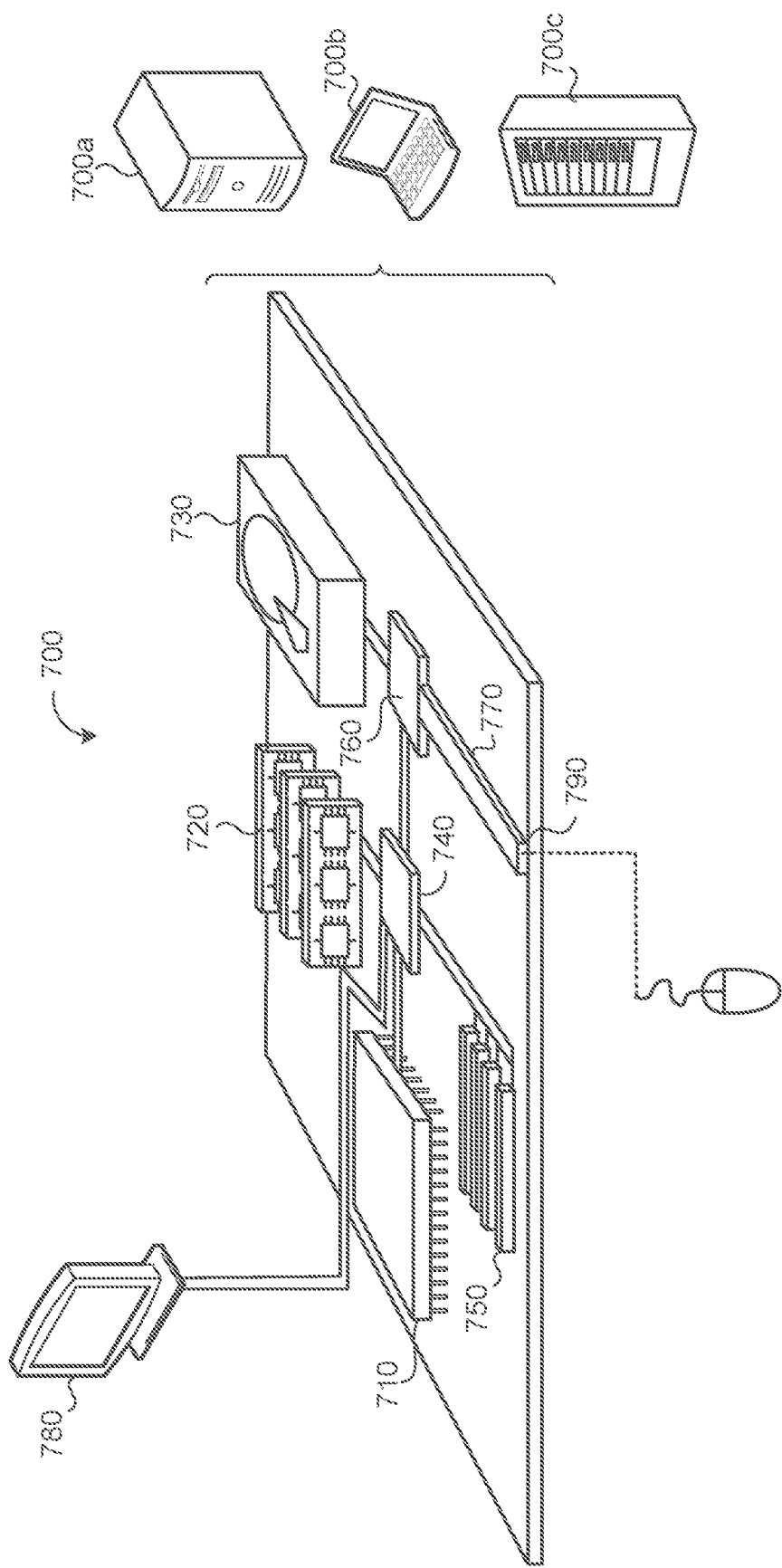
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, anti/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CI) ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), ICD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims

What is claimed is:

1. A computer-implemented method when executed by data processing hardware causes the data processing hardware to perform operations comprising:
   obtaining a base automatic speech recognition (ASR) model trained on non-biased data;
   obtaining a sub-model trained on biased data, the biased data representative of a particular domain;
   receiving a speech recognition request comprising audio data characterizing an utterance captured in streaming audio;
   determining whether the speech recognition request includes a contextual indicator indicating the particular domain;
   when the speech recognition request does not include the contextual indicator, generating, using the base ASR model, a first speech recognition result of the utterance by processing the audio data; and
   when the speech recognition request includes the contextual indicator:
      generating, using the base ASR model, an encoded output by processing the audio data;
      biasing, using the sub-model, the base ASR model toward the particular domain;
      generating, using the biased base ASR model, a sub-model output by processing the audio data, the sub-model output generated in parallel with the encoded output; and
      generating, using a decoder of the base ASR model, a second speech recognition result of the utterance by processing the encoded output and the sub-model output, the second speech recognition result biased toward one or more terms in the particular domain.

2. The computer-implemented method of claim 1, wherein the contextual indicator comprises a one-hot vector.

3. The computer-implemented method of claim 2, wherein the one-hot vector indicates a particular sub-model from a plurality of sub-models to be activated, each sub-model of the plurality of sub-models associated with a different domain.

4. The computer-implemented method of claim 2, wherein the operations further comprise projecting the one-hot vector into a phrase set embedding of an embedding space.

5. The computer-implemented method of claim 4, wherein projecting the one-hot vector into the phrase set embedding causes the phrase set embedding to activate a portion of the sub-model.

6. The computer-implemented method of claim 1, wherein the sub-model is disposed in a layer of the base ASR model.

7. The computer-implemented method of claim 6, wherein:
   the base ASR model comprises an encoder and the decoder; and
   the sub-model is disposed in between two layers of the encoder.

8. The computer-implemented method of claim 1, wherein one or more parameters of the base ASR model are frozen when generating the first and second speech recognition results.

9. The computer-implemented method of claim 1, wherein:
   the data processing hardware resides on a user device that captured the utterance in the streaming audio; or
   the data processing hardware resides on a remote system in communication with the user device via a network.

10. The computer-implemented method of claim 1, wherein the first speech recognition result is different from the second speech recognition result.

11. A system comprising:
- data processing hardware; and
- memory hardware in communication with the data processing hardware, the memory hardware storing instructions that when executed on the data processing hardware cause the data processing hardware to perform operations comprising:
  - obtaining a base automatic speech recognition (ASR) model trained on non-biased data;
  - obtaining a sub-model trained on biased data, the biased data representative of a particular domain;
  - receiving a speech recognition request comprising audio data characterizing an utterance captured in streaming audio;
  - determining whether the speech recognition request includes a contextual indicator indicating the particular domain;
  - when the speech recognition request does not include the contextual indicator, generating, using the base ASR model, a first speech recognition result of the utterance by processing the audio data; and
  - when the speech recognition request includes the contextual indicator:
    - generating, using the base ASR model, an encoded output by processing the audio data;
    - biasing, using the sub-model, the base ASR model toward the particular domain;
    - generating, using the biased base ASR model, a sub-model output by processing the audio data, the sub-model output generated in parallel with the encoded output; and
    - generating, using a decoder of the base ASR model, a second speech recognition result of the utterance by processing the audio data encoded output and the sub-model output, the second speech recognition result biased toward one or more terms in the particular domain.

12. The system of claim 11, wherein the contextual indicator comprises a one-hot vector.

13. The system of claim 12, wherein the one-hot vector indicates a particular sub-model from a plurality of sub-models to be activated, each sub-model of the plurality of sub-models associated with a different domain.

14. The system of claim 12, wherein the operations further comprise projecting the one-hot vector into a phrase set embedding of an embedding space.

15. The system of claim 14, wherein projecting the one-hot vector into the phrase set embedding causes the phrase set embedding to activate a portion of the sub-model.

16. The system of claim 11, wherein the sub-model is disposed in a layer of the base ASR model.

17. The system of claim 16, wherein:
- the base ASR model comprises an encoder and the decoder; and
- the sub-model is disposed in between two layers of the encoder.

18. The system of claim 11, wherein one or more parameters of the base ASR model are frozen when generating the first and second speech recognition results.

19. The system of claim 11, wherein:
- the data processing hardware resides on a user device that captured the utterance in the streaming audio; or
- the data processing hardware resides on a remote system in communication with the user device via a network.

20. The system of claim 11, wherein the first speech recognition result is different from the second speech recognition result.

* * * * *